United States Patent [19]

Hargreaves

[11] Patent Number: 5,337,147
[45] Date of Patent: Aug. 9, 1994

[54] METHODS AND CONTROL SYSTEMS FOR REGISTERING A DATUM POSITION BETWEEN TWO RELATIVELY MOVABLE COMPONENTS OF A MACHINE TOOL

[76] Inventor: James S. Hargreaves, 8 Ashfield Rd., Shipley West Yorkshire BD18 4JX, United Kingdom

[21] Appl. No.: 45,105

[22] Filed: Apr. 12, 1993

[30] Foreign Application Priority Data

Apr. 15, 1992 [GB] United Kingdom ............... 9208310.4

[51] Int. Cl.$^5$ ............................................. G01B 11/14
[52] U.S. Cl. ...................................... 356/375; 250/561
[58] Field of Search ............... 356/372, 373, 375, 399, 356/400, 401, 121; 250/561

[56] References Cited

U.S. PATENT DOCUMENTS

| | | | |
|---|---|---|---|
| 3,532,892 | 10/1970 | Murphy | 356/373 |
| 3,816,000 | 6/1974 | Fiedler | 356/400 |
| 4,021,119 | 5/1977 | Stauffer | 356/375 |
| 4,733,968 | 3/1988 | Robinson et al. | 356/375 |
| 4,928,019 | 5/1990 | Tomikawa et al. | 250/561 |

Primary Examiner—Richard A. Rosenberger
Assistant Examiner—Hoa Q. Pham
Attorney, Agent, or Firm—Watson, Cole, Grindle & Watson

[57] ABSTRACT

A method and apparatus for registering a datum position between two components of a machine tool having a path of relative movement, wherein relative movement of the components in path is monitored and a beam of parallel electro-magnetic radiation is directed from a source on one of the components across path of relative movement. A receiver is provided for receiving the beam at one position in relative movement between the components to define a datum position. Electromagnetic radiation received at receiver location is monitored and used to detect when the radiation received is equivalent to one half of the full beam emitted by the source to define datum position.

7 Claims, 2 Drawing Sheets

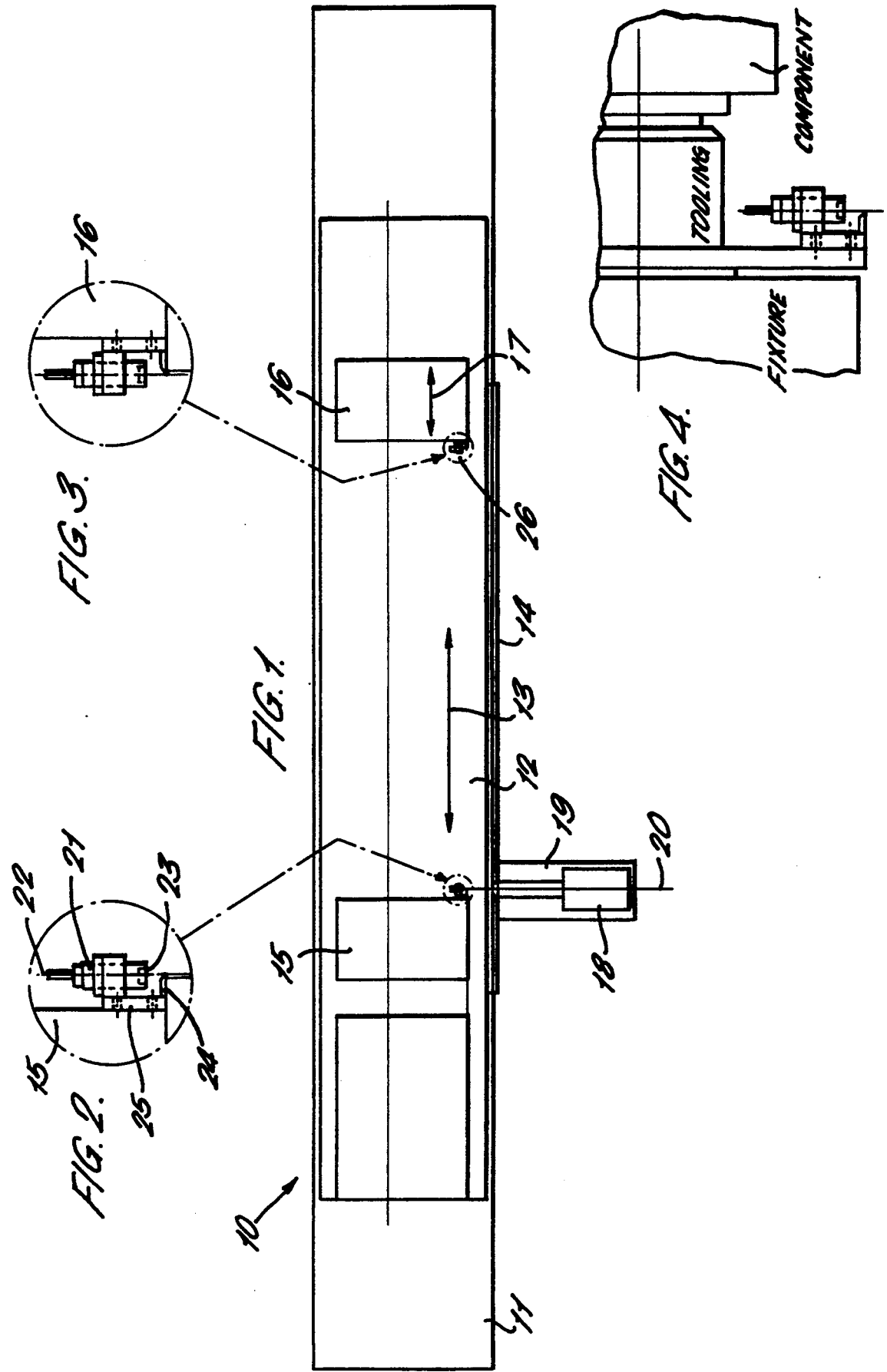

METHODS AND CONTROL SYSTEMS FOR REGISTERING A DATUM POSITION BETWEEN TWO RELATIVELY MOVABLE COMPONENTS OF A MACHINE TOOL

BACKGROUND OF THE INVENTION

1. Field of the Invention

This invention relates to methods and control systems for registering a datum position between two relatively movable components of a machine tool.

2. Background Prior Art

U.K. Patent Publication No. 2,164,444 discloses a position monitoring apparatus for monitoring back and forth travel between two relatively rotatable or linearly movable components. One component carries an interrupter and the other component carries a detector unit. The interrupter has projecting parts at predetermined positions, and the passage of the these parts past the detector unit is detected to monitor the relative position. The detector and the interrupter act via a logic circuit to identify datum position and to identify which side of the datum position the components lie and also to identify when the components are approaching the ends of the range of travel in order to bring movement to a stop in a home position at each end of the range of travel.

U.K. Patent Publication No. 2,171,196 discloses a detecting means for detecting the setting of an adjustable member such as a vehicle flap or rudder. The detecting means comprises a light source which emits parallel light and the emitted light beam of which is split into a measurement and a reference beam. These beams are conducted through respective fibre-optic cables which extend to the member and back to respective light-sensitive elements arranged in the vehicle. The cable for the measurement beam includes, in the proximity of the flap, an optical stop which acts as a displacement angle pick-up and the light passage area of which is variable in dependence on the setting of the flap. The cable for the reference beam may include an optical reference stop, the light passage area of which is variable by a setting motor in dependence on the difference between the output signals of the elements until this difference is zero. The motor can be coupled with equipment for determining the setting of the flap from the displacement of the reference stop.

SUMMARY OF THE INVENTION

The invention provides a method of registering a datum position between two components of a machine tool having a path of relative movement, comprising the steps of monitoring relative movement of the components in said path, directing a beam of parallel electro-magnetic radiation from a source on one of the components across said path of relative movement, providing a receiver for receiving the beam at one position in said relative movement between the components to define a datum position, monitoring electro-magnetic radiation received at said receiver location and detecting when the radiation received is equivalent to one half of the full beam emitted by the source to define said datum position.

In one embodiment of the invention in one half of the receiver may be obscured to light from the source and the beam falling on the other half is monitored to detect when one half of the full beam is incident on the receiver thereby to define said datum position.

In an alternative embodiment in the receiver may be divided into two areas spaced apart in the direction of said pass of movement between the components and the radiation incident on the two areas is monitored separately to detect when the radiation incident on one half is equal to the radiation incident on the other half to define said datum position.

In any of the above methods in the speed of relative movement between the components may be controlled and initial sensing of radiation on the receiver from the source may be used to cause a reduction in relative speed of the components whereby the components move towards said datum position relatively slowly.

The invention also provides a control system for a machine tool having relatively movable components to define a datum position in the paths of movement between the components, comprising means to monitor relative movement between the components, a source of electro-magnetic radiation on one component for producing a parallel beam of radiation to be directed across the path of movement between the components, beam receiver means on the other component to receive the beam of radiation at one location in the relative movement between the components, the receiving means including means to detect when one half of the full beam of radiation is incident on one half of the receiving means to define a datum at that position of relative movement between the components.

For example, means may be provided on the other component for obscuring one half of the beam receiving means defined in the direction of relative movement between the component so that the maximum radiation which reaches the receiving means from said source is one half the full beam radiation.

More specifically, an obscuring member may be mounted on said other component to extend over half the receiving means and having a vertical knife edge extending down a vertical centre line of the receiving means.

In an alternative arrangement the receiving means may comprise a plurality of sensors spaced on either side of a vertical centre line in the direction of the path of relative movement between the component and the detecting means detects when the radiation from the source received on either side of the centre line is equal.

The source of electro-magnetic radiation may be a laser and the receiving means comprise photo electric cell means.

BRIEF DESCRIPTION OF THE DRAWINGS

FIG. 1 is a plan view of a machine tool having a moving table carrying fixtures for the workpiece and embodying control systems for monitoring movement of the table/workpiece fixtures including datum definition;

FIG. 2 is a detailed view of part of one of the movable fixtures showing the mounting a photo electric cell which is part of the system for defining a datum position of the fixture;

FIG. 3 is a similar view to that of FIG. 2 showing part of the control system for defining datum position for the other movable fixture of the machine tool;

FIG. 4 is a detailed view of an extension of the control system to tooling of the machine tool;

DESCRIPTION OF THE PREFERRED EMBODIMENTS

Figure 5:
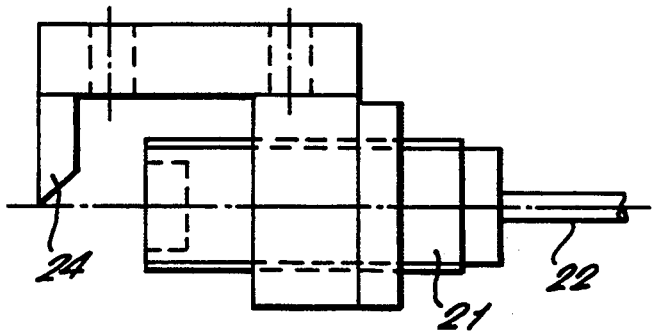
FIG. 5 is an enlarged view of the photo electric cell arrangement of the control system shown in FIG. 2.

Referring firstly to FIG. 1 of the drawings, there is shown a machine tool indicated generally by the reference numeral 10 comprising a fixed elongate base 11 on which an elongate table 12 is mounted for linear movement in the direction of the arrows 13 by a conventional arrangement such as a motor driven lead screw not shown.

A linear transducer 14 is provided extending parallel to the direction of movement to the table to monitor movement of the table with respect to the base.

The table carries a fixture or workhead 15 adjacent one end to receive and support one end of a workpiece to be operated on and a movable fixture or tailstock 16 adjacent the other end. The tailstock 16 is adjustable parallel to the direction of movement of the table in the direction of the arrows 17.

As indicated above, a linear transducer 14 is provided to monitor movement of the table along the base 11. To provide a datum position from which table movements can be calculated a datum defining system is provided which will now be described. The system comprises a laser or parallel light beam emitter 18 mounted on a bracket 19 extending laterally of and fixed to the base 11 or on a slide mounted for adjustment along the base 11 parallel to the direction of movement of the table. The laser or beam emitter faces transversely across the table with its optical axis 20 extending at right angles to the direction of movement 13 of the table.

Referring to FIG. 2, photo electric cell 21 is mounted on a bracket 25 secured to an end of the fixture or workhead 15 with the optical axis 22 of the cell also extending at right angles to the direction of movement 13 at the table. The axis 20 of the laser and 22 of the cell lie in the same horizontal plane so that as the fixture 15 moves with the table along the base 11, in one position the laser and cell will come into full alignment with their axis 20, and 22 coincident. The laser or parallel light beam emitted produces a beam of electro-magnetic radiation which is circular in cross-section and the photo electric cell 21 has a circular front aperture 23 of similar or greater diameter to receive the full beam of radiation.

Vertical knife edge 24 is mounted on bracket 25/fixture 15 to project half way across front face 23 of photo electric cell 21 with the edge of the cell in alignment with the optical axis 22 and extending parallel to a vertical diameter on the front face of the cell. Thus when the laser 18 and cell 21 are in alignment, only half the light emitted by the laser is received by the cell.

The cell is connected to a control circuit not shown which includes means for monitoring the signal produced by the cell. The circuit includes means to compare the current signal produced with a signal equivalent to one half the signal produced by exposure of the full beam from the laser on the cell. As the cell moves into register with the laser, the signal emitted by the cell increases with the increased incidents of light from the laser until, with the laser in complete alignment with the cell with their optical axis coincident, one half the light emitted by the laser is incident on the cell with the remainder of the cell obscured by the knife edge 24. The control circuit detects that the intensity of the radiation incident on the cell has reached one half the full beam of the laser to register that the cell and laser are in alignment and that the table 12 is in its datum position. Subsequent movements of the table are monitored by the transducer 14 taking in the datum position as zero.

The mechanism for traversing the table 12 along the base has a variable speed control so that the table can be brought towards the datum position at high speed and can be brought into its final position of alignment at a lower speed to avoid the risk of overshooting. The reduction in speed of movement of the table is initiated when light from the laser 18 is first incident on the cell 21 and a signal emitted by the cell is then used to initiate the speed control for the table to reduce the speed to slow movement for the final move towards full alignment between the cell and laser.

The fixture or workhead 15 may be fixed to the table 12 or may be movable along the table parallel to the direction of movement of the table. In the latter case it may be more convenient to monitor the movement of the table by monitoring movement of the tailstocks 16 in which case a photo cell arrangement 26 is provided on the tailstock 16 as illustrated in greater detail in FIG. 3. FIG. 4 shows a similar arrangement in which the photo cell is mounted on tooling on the table.

Figure 6:
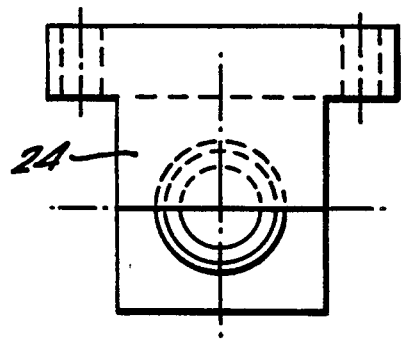
FIG. 6 is an end view of the cell shown in FIG. 5.
Figure 7:
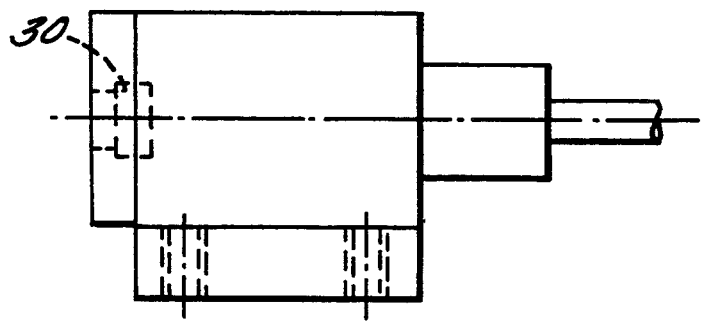
FIG. 7 is a plan view of an alternative cell arrangement.
Figure 8:
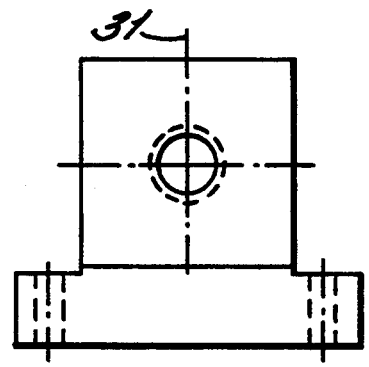
FIG. 8 is an end view of the cell arrangement of FIG. 7.

FIGS. 5 and 6 show the cell 21 and its associated knife edge 24 in greater detail and FIGS. 7 and 8 show an alternative receptor for the laser or light beam comprising a quadrant or multiple photo electric cell assembly 30. Cells are divided equally about a vertical centre line 31 indicated on FIG. 8 and the control circuit associated with the cell is arranged to detect when the beam of electro-magnetic radiation from the laser or light beam emitter 18 produces signals of equal intensity from the cells on either side of the vertical axis 31. A signal is then produced to indicate to the machine control that the table is in the datum position.

It will be appreciated that many modifications may be made to the above described embodiments without departing from the scope of the invention. For example the light beam source may be on a movable carriage with a positional feedback transducer to indicate its relevant position relative to a fixed or movable table.

Thus the light sensitive cell or cells transmit a signal to the machine control circuit when light energizes a cell or cells to indicate speed change from rapid to slow speed and also transmits a signal to the machine control when the light source intensity is suitably divided to indicate the relevant position between the source and the cells. The machine control can determine the actual position of the moving axis, the datum position, from positional information supplied by the axis or axes feedback transducers and previously determined calibrated positions of the axis or axes from the cell in position signals.

It will be appreciated that many modifications may be made to the above described embodiments without departing from the scope of the invention. For example, the table moving mechanism may comprise a motor driven ball screw and a rotary transducer may be connected to the lead screw to monitor table movement. In a further arrangement the table is moved by a rack and pinion mechanism with a rotary transducer coupled to the pinion to monitor table movement.

I claim:

1. A method of registering a datum position between two components of a machine tool having a path of relative movement, comprising the steps of monitoring relative movement of the components in said path, directing a beam of parallel electro-magnetic radiation from a source on one of the components across said path of relative movement, providing a receiver for receiving the beam at one position in said relative movement between the components to define a datum position, monitoring electro-magnetic radiation received at said receiver location and detecting when the radiation received is equivalent to one half of the full beam emitted by the source to define said datum position; wherein the improvement comprises controlling the speed of relative movement between the components and using initial sensing of radiation on the receiver from the source to cause a reduction in relative speed of the components whereby the components move towards said datum position relatively slowly.

2. A method as claimed in claim 1, wherein one half of the receiver is obscured to light from the source and the beam falling on the other half is monitored to detect when one half of the full beam is incident on the receiver and thereby to define said datum position.

3. A method as claimed in claim 1, wherein the receiver is divided into two areas spaced apart in the direction of said pass of movement between the components and the radiation incident on the two areas is monitored separately to detect when the radiation incident on one half is equal to the radiation incident on the other half to define said datum position.

4. A control system for a machine tool having relatively movable components to define a datum position in the paths of movement between the components, comprising means to monitor relative movement between the components, a source of electro-magnetic radiation on one component for producing a parallel beam of radiation to be directed across the paths of movement between the components, receiving means on the other component to receive the beam of radiation at one location in relative movement between the components, the receiving means including means to detect when one half of the receiving means to define a datum at that position of relative movement between the components; wherein the improvement comprises providing means on the other component for obscuring one half of the beam receiving means defined in the direction of relative movement between the component so that the maximum radiation which reaches the receiving means from said source is one half the full beam radiation, and mounting an obscuring member on said other component to extend over half the receiving means and having a vertical knife edge extending down a vertical center line of the receiving means.

5. A control system as claimed in claim 54, wherein receiving means comprises a plurality of sensors spaced on either side of a vertical center line in the direction of the path of relative movement between the component and the detecting means detects when the radiation from the source received on either side of the center line is equal.

6. A control system as claimed in claim 4, wherein the source of electro-magnetic radiation is a laser and the receiving means comprise photo electric cell means.

7. A control system as claimed in claim 4, wherein the beam of parallel radiation produced is circular in cross-section and the receiving means is likewise circular in cross-section.

* * * * *